Patented Jan. 13, 1925.

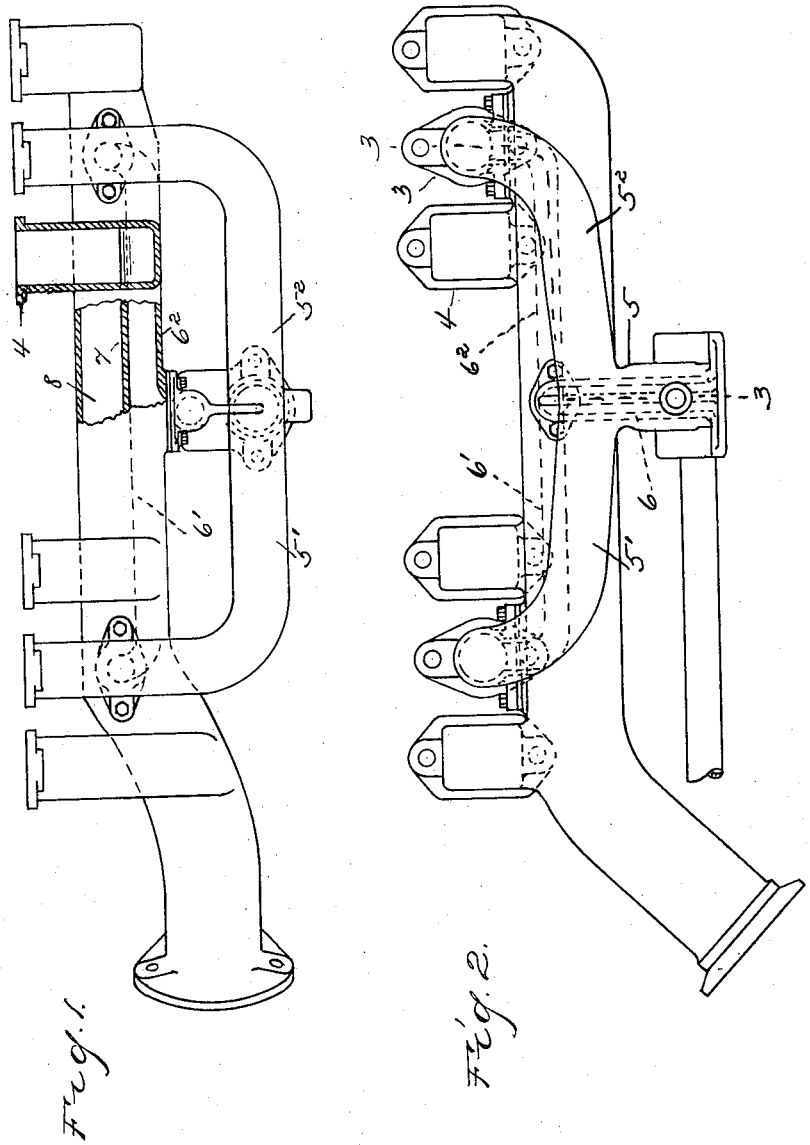

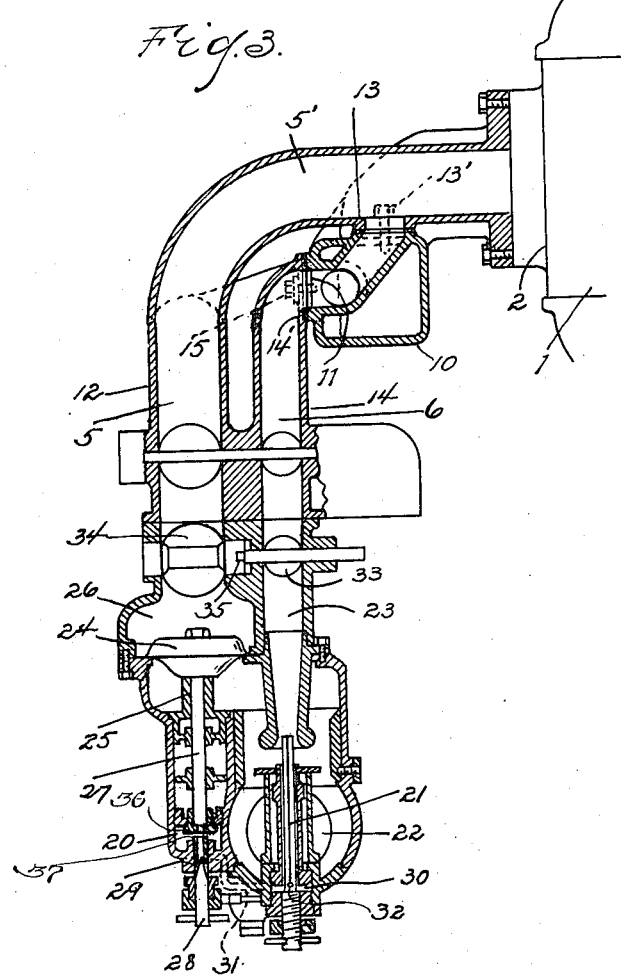

1,522,682

UNITED STATES PATENT OFFICE.

CARL C. HINKLEY, OF DETROIT, MICHIGAN.

MANIFOLD FOR INTERNAL-COMBUSTION ENGINES.

Application filed September 27, 1919. Serial No. 326,949.

*To all whom it may concern:*

Be it known that I, CARL C. HINKLEY, a citizen of the United States of America, residing at Detroit, in the county of Wayne and State of Michigan, have invented certain new and useful Improvements in Manifolds for Internal-Combustion Engines, of which the following is a specification, reference being had therein to the accompanying drawings.

The present invention relates to manifolds for internal combustion engines, its aim being to secure a proper mixing of the hydrocarbon fuel and air by heat treatment without impairing the volumetric efficiency.

In accordance with the invention, the primary air supply is mixed with the fuel and fed to the manifold separately from the auxiliary air supply, the mixture of primary air and fuel is then heated by being passed in close proximity to the passage for the exhaust gases, thereby thoroughly vaporizing the fuel, and the rich vaporized heated mixture is finally co-mingled with the auxiliary air just before passing into the engine cylinders. Thus but a part of the air is subjected to intensive heating, and the air supply as a whole is not expanded to an objectionable degree to thereby cause the loss in volumetric efficiency which occurs in ordinary manifolds wherein the whole mass of entering air is heated. That is, a greater mass of air is thus supplied to the cylinders at each stroke than is the case with ordinary heating manifolds. It will be understood, however, that both primary and secondary air may be heated to some extent prior to entering the manifold if desired, particularly in cold weather, this being in accordance with well known practice.

The invention also consists in a manifold of the novel type indicated above, together with a carburetor associated therewith and arranged to deliver the primary air and fuel mixture to said manifold separately from the secondary or auxiliary air.

Again, the invention consists in certain specific details, and in certain arrangements of parts hereinafter pointed out.

In the drawings:

Fig. 1 is a top plan view, partly in section, showing a preferred embodiment of the invention;

Figure 2 is a side view thereof;

Figure 3 is a section on line 3—3 of Figure 2, with a section through one type of carburetor adapted to cooperate with the manifolds.

The cylinder head of an ordinary internal combustion engine appears at 1, Figure 3, the parts being machined at 2 to receive the flanges and flange bolts of the combined intake and exhaust manifold wherein the invention is embodied, as is usual in such construction. As shown, there are two outlets from the intake passage of the manifold to the cylinders, and four outlets from the latter to the exhaust passage of the manifold, the corresponding attaching flanges appearing at 3 and 4 in Figures 1 and 2, but it will be understood that the number and relative arrangement of these inlets and outlets varies in practice with the number of cylinders and with other characteristics of the particular engine involved.

Deferring for the moment the particular construction of the several parts of the manifold which arise from considerations of casting and machining, it will be seen that the intake portion includes one passage 5 leading upwardly and having branches $5'-5^2$ extending laterally and inwardly to the inlets into the cylinders; it also includes a second upwardly leading passage 6, preferably of considerably less cross-section than the passage 5 and having laterally extending branches $6'-6^2$ communicating at their ends with the corresponding end portions of the passages $5'-5^2$, as best indicated in Fig. 3. It will also be observed that a portion of the passage 6 has a wall 7 which serves as a part of the wall for the passage 8 for the hot exhaust gases. As more fully explained later, the passage 6 is supplied with carbureted mixture, that is, a rich mixture of hydrocarbon fuel and air, whereas the passage 5 is supplied with uncarbureted air, the net result being that the rich mixture is heated to a relatively high degree with heat from the manifold to insure a much more complete vaporization of the fuel than would otherwise take place; at the same time, the major portion of the air supply—that coming through the passage 5—, particularly at high speeds, receives little or not heat from the manifold, and the objectionable loss of volumetric efficiency, due to excessive expansion of the air supply, such as has occurred heretofore, is avoided.

The actual construction of the manifold may vary considerably, but as shown it comprises; first, the element 10 which constitutes the exhaust manifold primarily and which is provided with an opening as indicated at 11, Figure 3; second, the air intake element 12, forming the passage 5—5'—5² and flanged at 13 for the reception of the bolts or screws 13'; and third, the fuel mixture intake element 14 which forms the passage 6—6'—6² and which is flanged at 14' for the reception of the bolts or screws 15. The construction is such that an intake element 12 and the fuel mixture intake element 14 are secured to the exhaust manifold element 10. An additional web is preferably employed for attaching the lower end portion of the element 14 to the element 12.

One type of carburetor, suitable for delivering the primary air and fuel mixture to the manifold separately from the auxiliary air is indicated in Fig. 3, but the actual construction may be varied widely. As shown, the fuel is fed from a chamber 20 (that is in communication with a float chamber, not shown) to the nozzle 21 and is there mixed with the primary air supply which enters through the passage 22; and from the nozzle the mixture flows through the mixture passage 23 to the mixture passage 6 of the manifold. Part of the air entering at 22 passes into the chamber and lifts the weighted auxiliary air valve 24 in its guide 25 to a greater or less degree, depending on the speed of the engine, whereupon the auxiliary air supply so formed flows upwardly through the passage 26 to the passage 5 in the manifold. The amount of fuel passing to the nozzle 21 from the chamber 20 is regulated by the hollow member 36 secured to the lower end of the stem 27 of the valve 24 and extending adjacent to the upper end of the tubular member 37 communicating with the space 29 about the needle valve 28. The fuel passes from the space 29 to the space 30 about the lower end of the nozzle through the passage 31, and finally into the interior of the nozzle through a hole 32, as will be readily understood. The needle valve 28 is longitudinally adjustable within the tubular member 37 to vary the cross-sectional area of the passage for fuel therethrough. The throttle valves 33—34, the stems of which are interconnected at 35, simultaneously control both passages 23 and 26.

Obviously, little if any air will flow through the passage 5 at the low speeds of the engine, and the ratio of the quantity of pure air to the quantity of mixture progressively increases with the speed of the engine. Thus a hot rich mixture is obtained at starting and a high volumetric efficiency is insured throughout all speeds of the engine.

As stated above, the actual details of the manifold and of the carburetor are subject to variation, and I do not wish, therefore, to be limited except as indicated by the subjoined claims.

What I claim as my invention is:

1. The combination with an internal combustion engine including an intake, and a carbureter for separately delivering fuel mixture and auxiliary air, of a manifold construction between said carbureter and said intake comprising a pair of separate passageways communicating with each other immediately adjacent said intake, one of said passageways being of smaller cross sectional area than the other and connected to the fuel mixture outlet of said carbureter, and the other passageway being connected to the auxiliary air outlet, means for heating said smaller passageway, a throttle valve in each passageway, and a rotatable common shaft upon which said valves are mounted for actuating the same simultaneously in both passageways.

2. The combination with an internal combustion engine including an intake and a carbureter for separately delivering fuel mixture and auxiliary air, of a manifold construction between said carbureter and said intake comprising a pair of separate passageways communicating with each other immediately adjacent said intake, one of said passageways being of smaller cross sectional area than the other and connected to the fuel mixture outlet of said carbureter, and the other passageway being connected to the auxiliary air outlet, means for heating said smaller passageway, a throttle valve in each passageway, and means for actuating said throttle valves simultaneously in both passageways.

In testimony whereof I affix my signature.

CARL C. HINKLEY.